US012755073B2

(12) United States Patent
Karweta et al.

(10) Patent No.: US 12,755,073 B2
(45) Date of Patent: Oct. 6, 2026

(54) COGNITIVE DESIGN ASSISTANT

(71) Applicant: INTERNATIONAL BUSINESS MACHINES CORPORATION, Armonk, NY (US)

(72) Inventors: Ewa Karweta, New York, NY (US); Xindeling Pan, San Francisco, CA (US); Aditya Patel, Brookline, MA (US); Jennifer M. Hatfield, San Francisco, CA (US); Christopher F. Ackermann, Fairfax, VA (US); Daniel Laughlin, Clayton, IN (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 1081 days.

(21) Appl. No.: 17/696,972

(22) Filed: Mar. 17, 2022

(65) Prior Publication Data

US 2023/0297741 A1 Sep. 21, 2023

(51) Int. Cl.
*G06F 7/48* (2006.01)
*G06F 30/12* (2020.01)
(Continued)

(52) U.S. Cl.
CPC .............. *G06F 30/27* (2020.01); *G06F 30/12* (2020.01); *G06F 2111/02* (2020.01)

(58) Field of Classification Search
CPC ....... G06F 2111/02; G06F 30/12; G06F 30/27
See application file for complete search history.

(56) References Cited

U.S. PATENT DOCUMENTS 10,185,703 B2 1/2019 Abrahami
10,459,699 B2 10/2019 Geva
(Continued)

FOREIGN PATENT DOCUMENTS

AU 2017218942 B2 11/2018

OTHER PUBLICATIONS

Rahmadi, Agyl Ardi, and Aris Sudaryanto. "Visual recognition of graphical user interface components using deep learning technique." Jurnal Ilmu Komputer dan Informasi 13.1 (2020): 35. (Year: 2020).*
(Continued)

*Primary Examiner* — Nithya J. Moll
(74) *Attorney, Agent, or Firm* — CHIP LAW GROUP

(57) ABSTRACT

A computer-implemented process for facilitating generation of a user interface design. The computer-implemented method provides for one or more processors to identify one or more elements added to a screen design by a first designer. The one or more processors predict one or more next elements of the screen design, based on the identified one or more elements added to the screen design and a learning model trained by machine learning techniques using a convolutional neural network. The one or more processors present the one or more next design elements as a recommendation to the first designer. The one or more processors determine a selection decision made by the first designer of the one or more next elements from the recommendation, and the one or more processors update learning model, based on selection decisions made by the first designer.

17 Claims, 5 Drawing Sheets

(51) Int. Cl.

| | |
|---|---|
| ***G06F 30/27*** | (2020.01) |
| *G06F 111/02* | (2020.01) |

(56) References Cited

U.S. PATENT DOCUMENTS

| | | | | |
|---|---|---|---|---|
| 10,929,110 | B2 | 2/2021 | Huang | |
| 2020/0134388 | A1* | 4/2020 | Rohde | G06F 40/14 |
| 2020/0394026 | A1* | 12/2020 | Huang | G06F 9/451 |
| 2021/0117484 | A1* | 4/2021 | Sollami | G06F 40/216 |
| 2021/0390011 | A1* | 12/2021 | Cser | G06N 3/047 |

OTHER PUBLICATIONS

Brückner, “Graphical User Interface Auto-Completion with Element Constraints,” Aalto University School of Science Master’s Programme in ICT Innovation, Master’s Thesis, Sep. 25, 2020, 105 pages.

Mell et al., “The NIST Definition of Cloud Computing”, National Institute of Standards and Technology, U.S. Department of Commerce, NIST Special Publication 800-145, Sep. 2011, 7 pages.

* cited by examiner

COGNITIVE DESIGN ASSISTANT

BACKGROUND

The present invention relates to application development, and more specifically, to artificial intelligence augmentation of application design.

The design of an online application includes decisions regarding the intended purpose of the application, the industry to which the application applies, and the user base for the application. Considerations of the component design elements of the application include user interaction with design components, the usability aspects of the elements, the effectiveness of flow sequence, and the recognition of important elements of a screen.

Multiple designers may often work in collaboration as a team under a particular application design project. In such cases, designers may work independently on-screen design and application components while using cloud-based collaboration tools, which may allow the separately designed application screens to integrate the screen designs within the project. Application design often includes multiple designers that may be at different levels of experience, knowledge, and competency using the most current methods and techniques and familiarity with best practices within various industries.

Application design includes the selection and use of design elements for a user interface (UI) and design components and structure on various screens of the application taking into account delivery of an optimal user experience (UX) while using the application. Designers may work with a design library that includes design elements and templates used to create screen designs of an application.

SUMMARY

A computer-implemented process for facilitating generation of a user interface design. The computer-implemented method provides for one or more processors to identify one or more elements added to a screen design by a first designer. The one or more processors predict one or more next elements of the screen design, based on the identified one or more elements added to the screen design and a learning model trained by machine learning techniques using a convolutional neural network. The one or more processors present the one or more next design elements as a recommendation to the first designer. The one or more processors determine a selection decision made by the first designer of the one or more next elements from the recommendation, and the one or more processors update the learning model, based on selection decisions made by the first designer.

DETAILED DESCRIPTION

Figure 1:
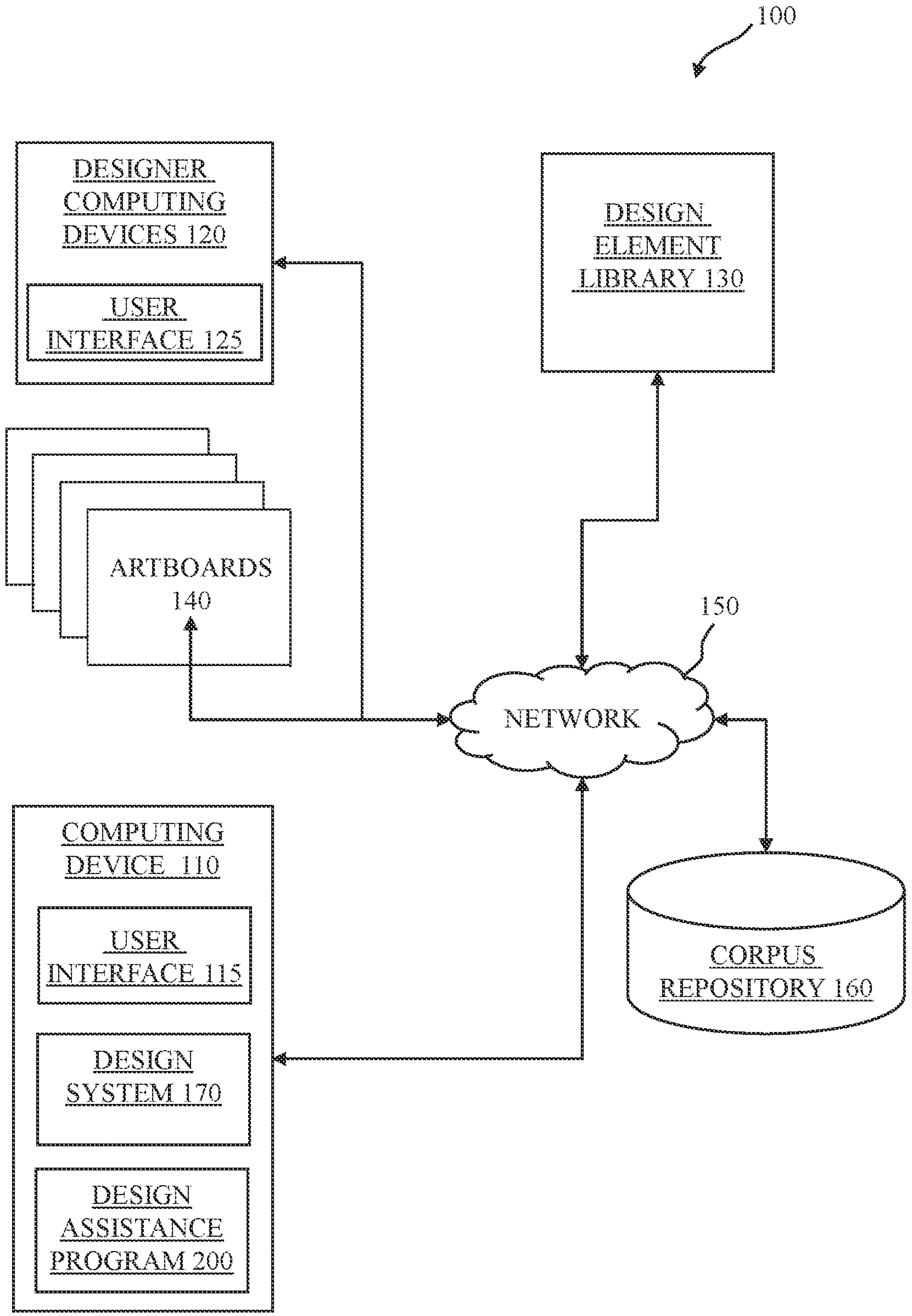
FIG. 1 is a functional block diagram illustrating a distributed computer processing environment, in accordance with an embodiment of the present invention.

Embodiments of the present invention recognize that application design development performed across large, dispersed teams can easily result in inconsistencies in design, screen building, flow and lead to mistake propagation. A dispersed development team may also include various levels of skill, experience, knowledge, and training among members, further contributing to team interaction issues, loss of design continuity requiring additional quality review, rework, and other inefficiencies.

For example, designers experienced in an industry for a particular project may be very familiar with best practices and even current trends of design in the development of a flow for an application. Other members of the project may be more familiar with another industry, or have limited experience, or may even be recently onboarded to the team, and may proceed to develop screen designs that do not include best practices for the project's industry or may lack awareness of current screen design trends. The project may proceed and include gaps in design elements, inconsistent design approaches, and may lack important accessibility considerations. The design issues among team members may include the propagation of inconsistencies and gap errors across multiple screens. The result may require extensive quality reviews, rework, extend development time and cost.

Embodiments of the present invention recognize that design systems may include collaboration tools that offer some benefits to team-based design projects, however, current tools lack the ability to identify inconsistencies in real-time across a multi-member design team and are unable to offer suggested alternatives that include best practices and current trends in the design of application screens for project types, industries, and audiences, maintaining consistency across flows and screens of the application.

Embodiments of the present invention provide a computer-implemented method, computer program product, and computer system for providing user interface design assistance. In some embodiments, a design assistance program (referred to below as design assistance program 200 of FIG. 1), provides design assistance for an online application project that includes multiple designers, as team members, operating on a cloud-based design system tool. Each team member has responsibility for a portion of the application design project and the project information includes application type, applicable industry, and user audience among other project attributes.

In embodiments, a designer initiates a file for a portion of the project and begins by adding one or more design elements to an artboard, for example, to design a flow consisting of multiple pages or screens. Embodiments of the present invention detect the elements added and predict a set of next elements likely to be added to the artboard for an initial screen. Embodiments base the prediction on a machine learning model using a convolutional neural network (CNN). Embodiments train the machine learning model by use of data from previous designs and projects, industry best practices, recent designs for the same industry, and current design activity by other designers assigned to other workstreams of the project. The designer assistance program presents the designer with recommendations for the current design on the artboard. The designer considers the recommendations and accepts and selects elements from the recommendations or declines the recommendations. The machine learning model of the design assistance program includes the actions by the designer as training data to improve subsequent recommendations.

In some embodiments, the design assistance program monitors design builds across designers of a project and identifies and maps inconsistencies as well as gaps in designs during build (i.e., in real-time) in areas of style, structure, function, and other attributes of usability and user experience (UX). In some embodiments, the design assistance program recognizes a type and style of an artboard design under build and presents recommendations of one or more templates for the screen design, providing efficiency and maintaining consistency in the design-build. In some embodiments, the design assistance program expedites the onboarding of new designers, significantly reducing the time-to-competence of new designers. In other embodiments, the design assistance program recognizes gaps or issues of accessibility with a current design, including across multiple screens, and provides an alert as well as recommended corrective actions. Embodiments reduce the design development time by reducing rework, enabling designers to focus on priority problem solving and enabling a first-pass polished quality design.

In some embodiments, the design assistance program analyzes the context of the file, including application type and purpose, industry, and user set. Embodiments utilize a corpus of design data containing historic designs and the most current designs by type and industry, design best practices, accessibility standards, and design system and industry standards. The design assistance program includes a trained machine learning model that determines the context of the current design-build and compares the current design with the corpus of design data to determine gaps and inconsistencies and provide real-time recommendations.

Embodiments of the present invention include terms referenced, herein, and described and/or defined as follows. The term "application design" refers to the elements, positioning, labeling, sizing, and attributes of the elements that are included on a screen or page. An application design may be oriented towards a user purpose, may include collection and presentation of information, and apply to a particular industry and include a style and other features other than the functional aspect of the application. For example, a design for an online retail business may include elements to collect information for identifying an item to purchase, identifying a user-buyer, obtaining shipping information, enabling the collection of purchase information and include progress indicators to help users know the steps involved and the-current step status.

The terms "artifact, screen, and page" refer to the design being created and a part of the application that includes a user interface for user interaction. In some instances, the artifact, screen, or page may be one of a series that comprises a flow for a user to follow. The term "artboard" refers to a design development component that enables a visual representation of information involved in the building of a design for a screen by adding and modifying design elements as a draft. In some cases, the artboard can be a discretely defined area in which design elements can be positioned.

A file refers to the design being created and may include one or a series of screens, and a design project includes a collection of multiple designs being developed for an application or website. In most instances, design building follows an atomic design model methodology, which follows a progression of starting with "atoms" or small individual design elements, the basic building blocks of a design. Combinations of certain atoms result in the formation of "molecules," which in design terms include pre-combined elements that are commonly used in designs and may be added as a single item of combined elements. Pre-combinations of molecules result in an "organism," which may form a portion of a screen design or the entire screen design. For example, a design may begin adding form labels to a design on an artboard. The designer continues by adding form entry elements. Embodiments of the present invention identify the design elements added, recognize the context and patterns, and predict the next set of design elements likely to be added, such as form fields, which are presented to the designer as recommendations. Embodiments continue to recognize the developing design and may recommend form groupings and even complete forms, following an atomic, molecule, organism design progression.

Embodiments enlist the use of a trained machine learning model using a component library, best practices as published, design trends by industry. A flow includes a series of design screens usually intended to guide a user through a process or achieve/reach a desired result. A flow can be designed to expedite navigation or intentionally slow navigation to enable user awareness of other features of a design screen. A design file may be a collection of flows and screens that comprise a particular aspect of the application design. Often a design file may be part of a design project that includes multiple files, with a file or combination of files designated as a workstream. Design elements or components are individual design objects that are positioned on an artboard as part of the build of an artifact/screen/page. A design element can be a button that initiates a programmable action, a form field, a breadcrumb, or another part of a design. A design template may be thought of as a predetermined combination of design elements intended for a particular use and context. A template can include multiple design elements and require only minor arrangement and labeling to complete a design screen build, greatly improving productivity.

The present invention will now be described in detail with reference to the Figures. FIG. 1 includes a functional block diagram illustrating a distributed computer processing environment, generally designated 100, in accordance with an embodiment of the present invention. FIG. 1 provides only an illustration of one implementation and does not imply any limitations with regard to the environments in which different embodiments may be implemented. Many modifications to the depicted environment may be made by those skilled in the art without departing from the scope of the invention as recited by the claims.

The descriptions of the various embodiments of the present invention have been presented for purposes of illustration but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

FIG. 1 depicts a functional block diagram illustrating a distributed data processing environment, in accordance with an embodiment of the present invention. FIG. 1 includes computing device 110, designer computing devices 120, design element library 130, artboards 140, and corpus repository 160, all interconnected via network 150. Network 150 can be, for example, a local area network (LAN), a wide area network (WAN), such as the Internet, a virtual local area network (VLAN), or any combination that can include wired, wireless, or optical connections. In general, network 150 can be any combination of connections and protocols that will support communication and data transmission between computing device 110, designer computing devices 120, design element library 130, artboards 140, and corpus repository 160, and other devices and elements of distributed data processing environment 100 (not shown).

Designer computing devices 120 represents a plurality of computing devices used by designers to access design system 170. Designer computing devices 120 enables a team of designers working on a multi-workstream project to build designs for workstream screens by accessing design element library 130 and building design drafts on respective instances of artboards 140. In some embodiments, designer computing devices 120 can be combinations of laptop computers, desktop computers, mobile computing devices, smartphones, tablet computers, or other programmable electronic devices or computing systems capable of receiving, sending, and processing data. In other embodiments, designer computing devices 120 may be stand-alone computing devices interacting with applications and services hosted and operating in a cloud computing environment. In still other embodiments, designer computing devices 120 may be blade servers, web-based server computers, or be included in a computing system utilizing clustered computers and components (e.g., database server computers, application server computers, etc.) that act, respectively, as a single pool of seamless resources when accessed within distributed data processing environment 100. In yet other embodiments, designer computing devices 120 can be netbook computers, personal digital assistants (PDAs), or other programmable electronic devices capable of receiving data from and communicating with computing device 110. Designer computing devices 120 may include internal and external hardware components, depicted in more detail in FIG. 3.

User interface 125 provides users of design computing devices 120 an interface to access features and functions of designer computing devices 120, respectively, and accessing design assistance program 200 via network 150. In some embodiments of the present invention, user interface 125 provides access to design element library 130 and artboards 140, enabling the creation of draft designs by adding and positioning design elements on a respective artboard of artboards 140 and providing management and updates to design element library 130 and corpus repository 160. User interface 125 also supports access to other applications, features, and functions of designer computing devices 120. User interface 125 supports access to alerts, notifications, and other forms of communications. In one embodiment, user interface 125 may be a graphical user interface (GUI) or a web user interface (WUI) and can receive user input and display text, documents, web browser windows, user options, application interfaces, and instructions for operation, and include the information (such as graphic, text, and sound) that a program presents to a user and the control sequences the user employs to control the program. In another embodiment, user interface 125 may also be mobile application software that provides an interface to features and functions of computing device 110. User interface 125 enables a user of computing device 110 to receive, view/hear, and respond to input, access applications, and perform functions available on computing device 110.

Design element library 130 includes a collection of design elements accessed by users of designer computing devices 120 through design system 170 (FIG. 1 depicts design element library 130 as separate for clarity). Users of designer computing devices 120 initiate a file for one or more screen designs of a workstream for a project, select elements from design element library 130, and place elements in a position on a respective artboard of artboards 140. Design element library 130 includes levels of element combinations and may include design structures following an atomic design that include atomic level, molecular level, and organism level.

Each level of the atomic design includes greater complexity and combinations of lower-level elements. For example, a design element represents a basic building block of a design, analogous to an atom of a physical entity. A design element may be a form label, an input field, a color, or a button included as an element in design element library 130. A combination of design elements may be considered analogous to a molecular combination of atoms, such as combining a form label, an input field, and a button. A collection of design combinations may be considered as analogous to an organism, and a web screen or portions of a web screen may include collections of design element combinations to form an interface component such as a masthead and logo, navigation features, search forms, etc. Design element library 130 includes combinations and collections of design elements that form templates used for design builds.

Artboards 140 provide an area for design building by users of designer computing devices 120. A respective artboard of artboards 140 includes a self-contained area acting as a container for design element combinations in building an interface for a screen of a project workstream, such as for a particular flow. Artboards 140 include draft designs that can be monitored during build by design assistance program 200 as design creation proceeds by a user of a respective device of designer computing devices 120. Designs from an instance of artboards 140 can be saved to a file and shared or combined with other files of the same workstream and project.

Corpus repository 160 includes a collection of historic designs, published best practices of design, standards, guidance, and trends from consortiums, and governing bodies, all aligned by design project type and by industry. Corpus repository 160 includes recently performed designs that may include the most current recommendations and preferences, as well as the consensus thinking of design practices to avoid or discontinue. Corpus repository 160 also includes the most current accessibility guidelines. Corpus repository 160 provides a source of machine learning training data for design assistance program 200.

Embodiments of the present invention include a statistical model as a machine learning approach in which design recommendations, guidance, and gap and inconsistency detection result from a trained machine learning model. The training data for the model includes optical and image recognition applied to individual design elements, combinations of design elements, as well as templates and collections of design element combinations organized into an interface for a screen. The machine learning model includes a convolutional neural network (CNN) in which sets of design elements composing part or all of a design are fed into the CNN. The statistical model resulting from the CNN can be trained on successful designs and the statistical model learns unsuccessful and ineffective designs as well, so that when encountering a design under build, a determination of design adequacy and effectiveness can be made. As the machine learning model monitors a current design being built, the model continues to learn from decisions made regarding accepted and denied recommendations for the in-process designs.

Computing device 110, includes user interface 115 and design assistance program 200. In some embodiments, computing device 110, can be a laptop computer, a desktop computer, a mobile computing device, a smartphone, a tablet computer, or other programmable electronic device or computing system capable of receiving, sending, and processing data. In other embodiments, computing device 110 may be a stand-alone computing device interacting with applications and services hosted and operating in a cloud computing environment. In still other embodiments, computing device 110 may be a blade server, a web-based server computer, or be included in a computing system utilizing clustered computers and components (e.g., database server computers, application server computers, etc.) that act as a single pool of seamless resources when accessed within distributed data processing environment 100. In yet other embodiments, computing device 110 can be a netbook computer, a personal digital assistant (PDA), or other programmable electronic devices capable of receiving data from and communicating with computing device 110. Computing device 110 may include internal and external hardware components, depicted in more detail in FIG. 3.

User interface 115 provides users of computing device 110 an interface to access features and functions of computing device 110, including design assistance program 200. In some embodiments of the present invention, user interface 115 provides access for training and maintaining design assistance program 200 and provides management and updates of design element library 130 and corpus repository 160. User interface 115 also supports access to other applications, features, and functions of computing device 110. User interface 115 supports access to alerts, notifications, and other forms of communications. In one embodiment, user interface 115 may be a graphical user interface (GUI) or a web user interface (WUI) and can receive user input and display text, documents, web browser windows, user options, application interfaces, and instructions for operation, and include the information (such as graphic, text, and sound) that a program presents to a user and the control sequences the user employs to control the program. In another embodiment, user interface 115 may also be mobile application software that provides an interface to features and functions of computing device 110. User interface 115 enables a user of computing device 110 to receive, view/hear, and respond to input, access applications, and perform functions available on computing device 110.

Design system 170 provides cloud-based collaborative design tools accessed by user interface 125 of designer computing devices 120 via network 150. Design system 170 enables artboards 140, which are displayed for users of designer computing devices 120 on user interfaces 125. In some embodiments, design assistance program 200 works in conjunction with design system 170 during design creation projects. In other embodiments, design system 170 includes design assistance program 200 as an integrated module.

Design assistance program 200 operates in conjunction with design system 170. In some embodiments, design assistance program 200 operates in a cloud-based environment in conjunction with design system 170. Design assistance program 200 includes a statistical machine learning model trained by data including historical and current designs, published best practices and guidance, consortium standards and trends, aligned by design type, industry, and target audience. Design assistance program 200 monitors design builds across multiple designers collaborating on a design project of one or more workstreams.

Design assistance program 200 includes a machine learning model trained to recognize a context of a design being built. Design assistance program 200 determines the context of a design based on project set-up information and from a comparison of recognized sets of design elements added to an artboard during a design-build to the design contents of corpus repository 160. In some embodiments, design assistance program 200 detects individual and combination design elements added to the artboard during the build of a design. Based on the context of the design, design assistance program 200 predicts a next set of design elements consistent with the determined design type, industry, and context, and presents a list of the predicted design elements to the designer. In some embodiments, the presented list may include one or more templates aligned with the determined design type, or consistent with templates applied to designs by other designers of a team working on the same workstream or project.

Design assistance program 200 tracks the selections made by the designer from the presented list of predicted design elements and includes the selection information for continuous learning by the machine learning model trained using a convolutional neural network and data from successful and unsuccessful designs, as well as current industry best practices, standards, accessibility guidelines and the most current completed designs accessible to design assistance program 200. The use of the selection information from recommended design elements predicted as a "next design element" improves the model for subsequent design activity and projects.

In some embodiments, design assistance program 200 determines accessibility issues with the current design, based on model training and access to accessibility guidelines, alerts the designer of issues, and presents recommendations to resolve the issues. In some embodiments, design assistance program 200 may determine an accessibility issue that occurs on an individual design screen of a flow, whereas in other embodiments, design assistance program 200 identifies and alerts the designer of accessibility issues across multiple design screens. Design assistance program 200 identifies the screens with accessibility issues, presents recommended changes, and monitors the selections and actions taken by the designer, including the selections and actions as feedback for model improvement for future recommendations.

In some embodiments, design assistance program 200 monitors design builds across multiple artboards used by multiple designers simultaneously and in real-time. The broad monitoring activity provides effective project design consistency determination by providing consistent design element recommendations across designers and workstreams of a project. In some embodiment, design assistance program 200 identifies design gaps and inconsistencies, presents alerts and notifications to designers, and adjusts recommendation of design elements towards achieving and maintaining consistency of design within the project and inclusion of best practices and current standards throughout the project. In some embodiments, design assistance program 200 presents "soft alerts" for less significant inconsistencies, gaps, or design choice issues. In other embodiments, design assistance program 200 presents a disruptive alert for more significant design issues, to ensure immediate attention and avoid propagation of issues.

In some embodiments, a designer may present an alternative design element that may replace a global design element within a project. Design assistance program 200 may present the proposed alternative design element for consideration to the project team of designers. In some embodiments, the use of the proposed alternative design element may be voted upon to include globally within the project. In other embodiments, a team leader or client decision-maker may decide to accept or reject the proposed alternative.

Design assistance program 200 continues monitoring a design-build in progress and determined whether additional design elements are added to the artboard for the current design screen, and proceeds until receiving an indication of design completion.

Figure 2:
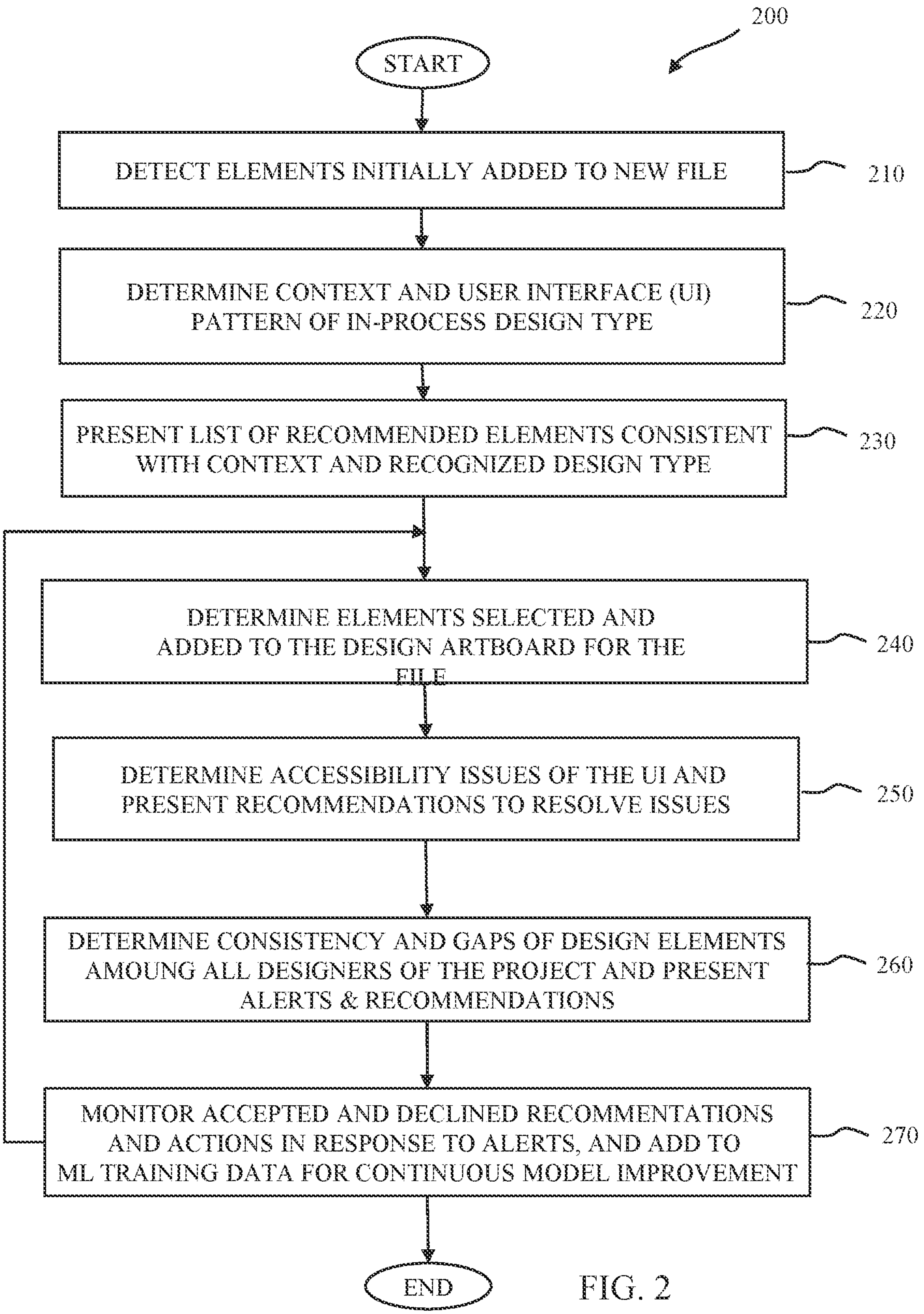
FIG. 2 depicts a flowchart of the operational steps of a design assistant program, in accordance with an embodiment of the present invention.

FIG. 2 depicts a flowchart of the operational steps of design assistance program 200, in accordance with an embodiment of the present invention. Design assistance program 200 improves the design process by employing a trained machine learning model that can recognize likely combinations of design elements, types of designs, best practice designs, and accessibility aspects of designs. Design assistance program 200 learns from a corpus repository of design history including the most recent and even current designs. Training of design assistance program 200 includes using data that includes industry and design type best practices, standards, and guidance from published sources and internal practice.

Design assistance program 200 detects design elements added to an artboard for a new design file (step 210). Design assistance program 200 accesses an artboard of a designer logged in to a design system. The access to the artboard includes setup information of the design project, a design type, an industry associated with the design project, and information identifying other designers also associated with workstreams of the current design project. Design assistance program 200 monitors the artboard as a design for a screen proceeds, detecting design elements added to the artboard. Design assistance program 200 identifies the respective design elements in real-time as the design elements are added to the artboard.

For example, a first designer of a design project logs in to a design system hosted in a cloud environment and performs a setup of the design project for a set of screens comprising two flows of a workstream. Design assistance program 200 determines the project and designer identity, the design type, and the industry, and accesses the monitoring capability of the artboard used by the first designer. The first designer selects design elements from design element library 130.

Design assistance program 200 determines a context and user interface patterns of the in-process design (step 220). Design assistance program 200 uses the trained machine learning model to determine the context of the design based on the detected initial design elements added to the artboard for the current screen design. In some embodiments design assistance program 200 uses project setup information to narrow the context determination, using information that indicates the applicable industry and design type, as well as audience type if supplied. Design assistance program 200 determines patterns from the design elements added to the artboard and based on training data predicts the user interface type associated with the current design-build. Design assistance program 200 relies on training data from historic and recent designs as well as standards, best practices, and guidance associated with industry and design type, to determine a prediction for the in-process design.

For example, design assistance program 200 receives training data from corpus repository 160 as well as input regarding designs considered successful and unsuccessful. Design assistance program 200 also receives training data by using repository input of best practices, standards, and guidance aligned by industry and design type. Design assistance program 200 determines the context by combining input from project setup information with the patterns of design elements added from design element library 130 to an artboard of artboards 140, by a designer of the project.

Design assistance program 200 presents a list of recommended elements consistent with the context and recognized design type (step 230). Having determined a context and design pattern from the initial design elements added to the artboard by the designers, design assistance program 200 predicts a next set of design elements to be added to the artboard and presents a "next set" list of design elements to the designer for consideration to add to the artboard.

For example, design assistance program 200 determines a context of a project to be a retail flow design for navigation to a specific set of items, and the pattern recognized by the initial design elements added from design element library 130 to the artboard of artboards 140 indicates check box selection adjacent to text lists. Design assistance program 200 presents a listing of design elements that include a progress indicator with status circle and forward and backward navigation arrows as next element recommendations.

Design assistance program 200 determines recommended elements selected and added to the design artboard for the file (step 240). Design assistance program 200 determines the selected design elements from the recommended list and those not selected and includes the data as feedback to the prediction of a "next set" of design elements. The data from selected design elements provides additional training data associated with the context and pattern determinations made by the machine learning model of design assistance program 200. The selected design elements will establish a positive reinforcement with the determined context and pattern of the in-process design, and the design elements not selected will establish a negative reinforcement, with a net benefit of improving the determination of context and pattern, and the associated design elements predicted to be added to the screen design being build on the artboard.

Design assistance program 200 determines accessibility issues of the user interface and presents recommendations to resolve issues (step 250). As the current design-build proceeds, design assistant program 200 analyzes the design elements added to the artboard and the overall design being built and checks the design and design elements for inclusion of known accessibility standards and opportunities for accessibility feature improvements. Accessibility issues may include selecting colors as a distinguishing characteristic and not accounting for color blindness, or inadequate indicators of user action required or expected. Design assistant program 200 determines absent accessibility features, inadequate or inappropriate accessibility features, and incorrectly applied accessibility features of the in-process design.

Design assistance program 200 presents the designer with recommendations to resolve the determined accessibility issues, and the designer accepts or declines the recommendations. Recommendations presented by design assistance program 200 are relevant and specific to the in-process design and the accessibility issues determined. For example, a designer building a form entry screen may include form fields and labels that lack adequate contrast and result in poor or missed recognition by users. Design assistance program 200 detects the poor contrast and references accessibility guidelines and standards and generates one or more recommendations presented to the designer to resolve the accessibility issue. In some embodiments, the design may be alerted with a soft alert, which provides notice without a disruptive intervention. In some embodiments, design assistance program 200 determines the significance of the accessibility issue and whether the issue can be found across multiple screens or pages of the design and provide a disruptive alert to the designer, requiring action by the designer in order to proceed.

Design assistance program 200 determines the consistency and gaps of design elements among all designers of the design project and presents alerts and recommendations (step 260). In some embodiments, design assistance program 200 provides continuous monitoring of design builds across a project that may include multiple artboards used by multiple designers working on the same project. Design assistance program 200 detects inconsistencies and gaps of design element characteristics that occur among all designers of the project. The inconsistencies may result from variation in design element selections by individual designers that would result in a different look, feel, and function within the application for actions and navigation by users. Gaps may occur by omission by some designers and inclusion by other designers of elements or accessibility features in a design. Design assistance program 200 generates alerts for identified inconsistencies and gaps and provides recommendations for designers to resolve the identified issues.

Design assistance program 200 monitors accepted and declined recommendations and actions in response to alerts and includes the feedback in machine learning training data for continuous improvement of the model (step 270). Embodiments of the present invention provide the benefit of learning from the most recent and current designs in progress across all designers of the project. Design assistance program 200 continuously learns from the accepted and rejected recommendations detected during all design builds, improving recommendations for changes based on the in-process learning, as well as from the design system used, the designated industry for the project, the best practices acknowledged, and the platform on which the design will be applied (e.g., from setup information). Continuous learning by the machine learning model of design assistance program 200 enables changes to recommendations as the design-build continues and changes. Designers of a subsequent project design, benefit from feedback and learning of current and previous designs.

The following use cases are provided to further clarify and emphasize features of the embodiments of the present invention.

A designer in the process of building a design includes a progression/stepper set of design elements. As the designer creates a series of steps in a flow, design assistance program 200 recognizes a progression of steps and recommends a progress/stepper (molecule or organism) that would best fit the current design based on other elements included in the artboard and setup information. If the user accepts the recommendations, then the accepted elements would be added to the screen design (i.e., artifact).

As a designer creates a new "design" by adding elements to an artboard, the designer embodiments of the present invention present the designer with suggestions based on industry best practice, machine learning, latest trends, viewport size and device type, operating system, and other inputs (such as UI kits, preferences, etc.) for wayfinding and progress/step navigation. Design acceptance program 200 provides recommendations for the in-build design according to the system's understanding of the artifacts being created. The user can accept and use or decline and dismiss the recommendations. The system learns from the users' actions and selections and adjusts recommendations to align with design components that the user often selects.

A designer creates a page that will make use of a breadcrumb. Design acceptance program 200 recommends a breadcrumb and queries the designer to identify the previous page and/or next page and provides a list of pages or proposes a new page to select from. Design acceptance program 200 dynamically understands the relationship of the pages and, subsequent to the designer's response and selection, provides breadcrumbs for identified pages with the correct relationship and flow.

Emma recently graduated as a web application designer but lacks industry experience. After onboarding, Emma receives an assignment to a new project for a financial service client. Emma's lack of industry experience includes a lack of familiarity with common patterns used for this type of client. Design assistance program 200 helps Emma to rapidly reach a high productivity level. While designing for a mobile payment solution, the design assistance program 200 automatically recommends considering the addition of a policy agreement checkbox at the end of the flow. Embodiments provide a recommendation that includes a design pattern commonly used for the industry and the payment solution being designed by Emma. The system can also learn components that Emma's team used for this solution and the component data will be used to train the cognitive engine of the machine learning model, such that design assistance program 200 provides improved recommendations next time.

Jake has design experience and skills for both user experience (UX) and user interfaces (UIs). Jake current project includes work on designing for multiple personas with multiple experiences for a large insurance client. The design team has global representation and includes three workstreams, one of which includes Jake's current assignment. Jake encounters problems with making sure that the various design workstreams maintain consistency in design patterns. The design team has issues relating to consistency with style, look and feel, but also the treatment of functionality and navigation. Design assistance program 200 monitors the in-process design builds of all designers of Jake's team and identifies and alerts designers of inconsistencies and recommends designs for navigation and function consistently to all team members, based on the best practices and learning from prior designs projects for the insurance industry.

Figure 3:
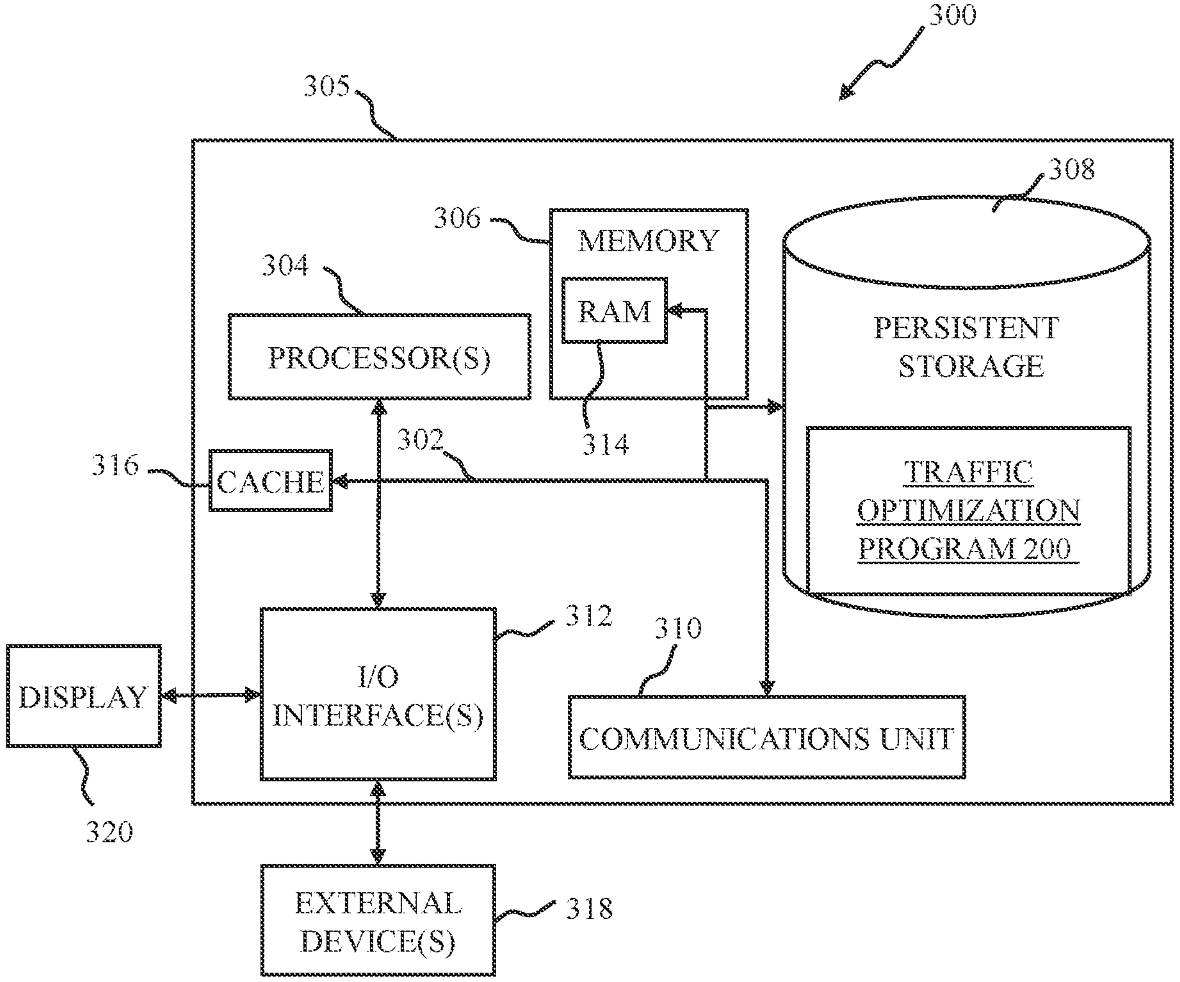
FIG. 3 depicts a block diagram of components of a computing system, including a computing device configured to operationally perform the design assistant program of FIG. 2, in accordance with an embodiment of the present invention.

FIG. 3 depicts a block diagram of components of computing system 300, including computing device 305, configured to include or operationally connect to components depicted in FIG. 1, and with the capability to operationally perform design assistance program 200 of FIG. 2, in accordance with an embodiment of the present invention. Computing device 305 includes components and functional capability similar to components of computing device 110 (FIG. 1), in accordance with an illustrative embodiment of the present invention. It should be appreciated that FIG. 3 provides only an illustration of one implementation and does not imply any limitations with regard to the environments in which different embodiments may be implemented. Many modifications to the depicted environment may be made.

Computing device 305 includes communications fabric 302, which provides communications between computer processor(s) 304, memory 306, persistent storage 308, communications unit 310, an input/output (I/O) interface(s) 312.

Communications fabric 302 can be implemented with any architecture designed for passing data and/or control information between processors (such as microprocessors, communications, and network processors, etc.), system memory, peripheral devices, and any other hardware components within a system. For example, communications fabric 302 can be implemented with one or more buses.

Memory 306, cache memory 316, and persistent storage 308 are computer-readable storage media. In this embodiment, memory 306 includes random access memory (RAM) 314. In general, memory 306 can include any suitable volatile or non-volatile computer-readable storage media.

In one embodiment, design assistance program 200 is stored in persistent storage 308 for execution by one or more of the respective computer processors 304 via one or more memories of memory 306. In this embodiment, persistent storage 308 includes a magnetic hard disk drive. Alternatively, or in addition to a magnetic hard disk drive, persistent storage 308 can include a solid-state hard drive, a semiconductor storage device, read-only memory (ROM), erasable programmable read-only memory (EPROM), flash memory, or any other computer-readable storage media that is capable of storing program instructions or digital information.

The media used by persistent storage 308 may also be removable. For example, a removable hard drive may be used for persistent storage 308. Other examples include optical and magnetic disks, thumb drives, and smart cards that are inserted into a drive for transfer onto another computer-readable storage medium that is also part of persistent storage 308.

Communications unit 310, in these examples, provides for communications with other data processing systems or devices, including resources of distributed computer processing environment 100. In these examples, communications unit 310 includes one or more network interface cards. Communications unit 310 may provide communications through the use of either or both physical and wireless communications links. Design assistance program 200 may be downloaded to persistent storage 308 through communications unit 310.

I/O interface(s) 312 allows for input and output of data with other devices that may be connected to computing system 300. For example, I/O interface 312 may provide a connection to external devices 318 such as a keyboard, keypad, a touch screen, and/or some other suitable input device. External devices 318 can also include portable computer-readable storage media such as, for example, thumb drives, portable optical or magnetic disks, and memory cards. Software and data used to practice embodiments of the present invention, e.g., design assistance program 200 can be stored on such portable computer-readable storage media and can be loaded onto persistent storage 308 via I/O interface(s) 312. I/O interface(s) 312 also connects to a display 320. Display 320 provides a mechanism to display data to a user and may, for example, be a computer monitor.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed. Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 4:
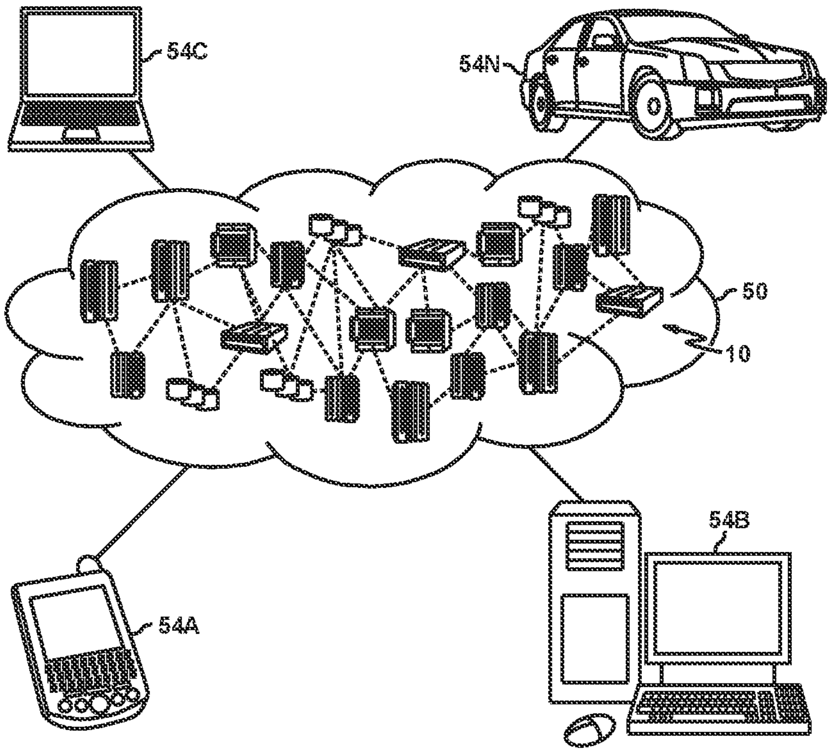
FIG. 4 depicts a cloud computing environment according to an embodiment of the present invention.

Referring now to FIG. 4, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 4 are intended to be illustrative only and that computing nodes 10 and cloud computing environment 50 can communicate with any type of computerized device over any type of network and/or network addressable connection (e.g., using a web browser).

Figure 5:
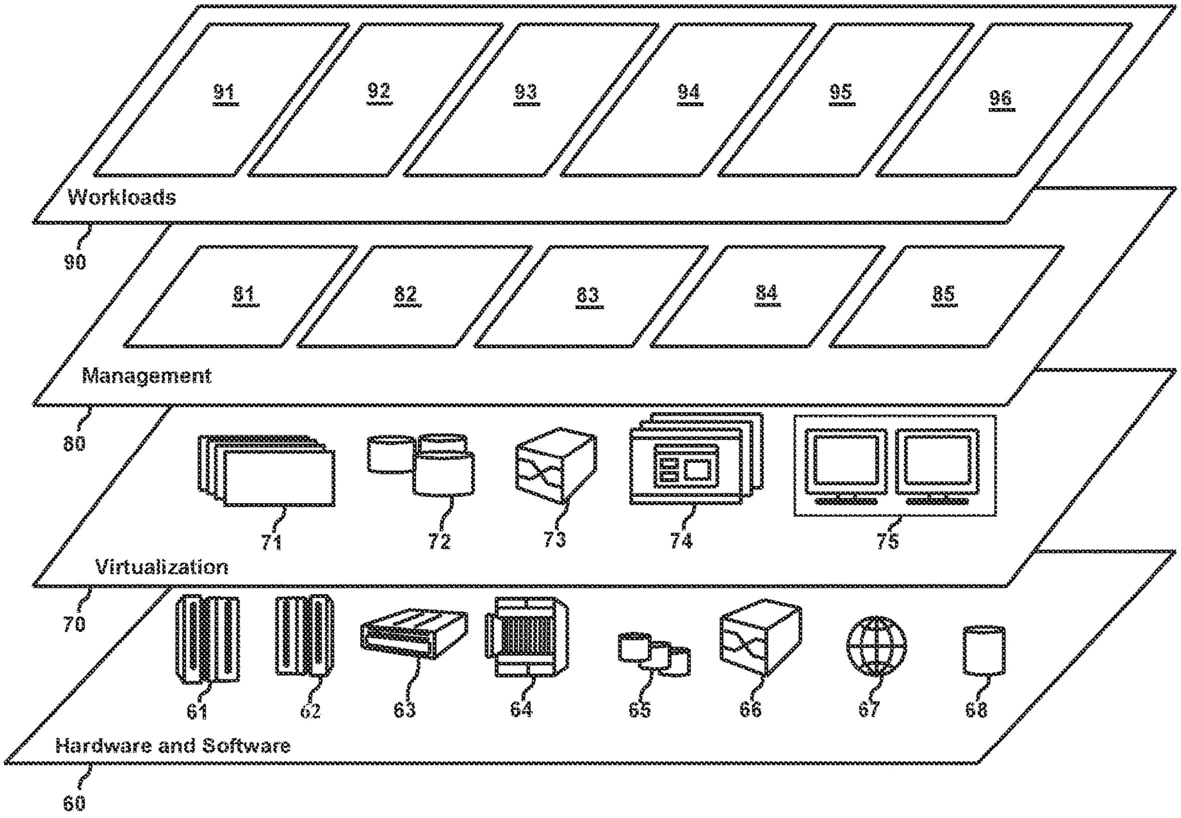
FIG. 5 depicts abstraction model layers according to an embodiment of the present invention.

Referring now to FIG. 5, a set of functional abstraction layers provided by cloud computing environment 50 (FIG. 4) is shown. It should be understood in advance that the components, layers, and functions shown in FIG. 5 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and facilitation of design generation of user interfaces 96.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A computer-implemented method for facilitating generation of a user interface design, the computer-implemented method comprising:

training, by one or more processors, a machine learning model based on data associated with historic projects, data associated with a project type, data associated with an industry type, data associated with accessibility guidance and standards, and data associated with design best-practices associated with application design;

detecting, by the one or more processors, one or more elements added to a screen design of a user interface of an application by a first designer during the application design, wherein the application design includes a type of the one or more elements of the user interface, positioning of the one or more elements on the user interface, sizing of the one or more elements, and attributes of the one or more elements;

predicting, by the one or more processors, one or more next design elements of the screen design, based on the detected one or more elements added to the screen design and the trained machine learning model;

controlling, by the one or more processors, presentation of the one or more next design elements that are visual elements selectable on a design artboard for a design file as a recommendation to the first designer;

determining, by the one or more processors, whether the one or more next design elements from the recommendation are selected and added to the design artboard by the first designer;

and updating, by the one or more processors, the trained machine learning model, based on the determining that the one or more next design elements are selected and added to the design artboard.

2. The computer-implemented method of claim 1, further comprising:

monitoring, by the one or more processors, design builds of a plurality of designers working on a design project, wherein the plurality of designers includes the first designer;

determining, by the one or more processors, inconsistencies of design between designs by the plurality of designers, wherein the inconsistencies are determined based on the machine learning model;

determining, by the one or more processors, recommendations to resolve the inconsistencies of design element characteristics; and presenting, by the one or more processors, an alert regarding the inconsistencies and the recommendations to resolve the inconsistencies, to the plurality of designers with the designs having the inconsistencies.

3. The computer-implemented method of claim 2, further comprising:

receiving, by the one or more processors, a proposed global design by a designer of the plurality of designers of the design project;

distributing, by the one or more processors, the proposed global design to the plurality of designers of the design project;

determining, by the one or more processors, a decision regarding use of the proposed global design by input from the plurality of designers; and adjusting, by the one or more processors, the recommendations presented to respective designers of the plurality of designers, based on the decision regarding the use of the proposed global design.

4. The computer-implemented method of claim 1, wherein a predicted next design element includes a template that is determined by recognition of a combination of the one or more next design elements added by the first designer to the design artboard.

5. The computer-implemented method of claim 1, wherein a context and a pattern of the user interface is determined, based on setup information of a design project and the addition of the one or more next design elements to the design artboard.

6. The computer-implemented method of claim 1, further comprising:

identifying, by the one or more processors, accessibility issues associated with the screen design; and presenting, by the one or more processors, an alert and recommendations addressing the identified accessibility issues associated with the screen design, to the first designer.

7. A computer program product for facilitating generation of a user interface design, the computer program product comprising:

one or more computer-readable storage media, and program instructions stored on the one or more computer-readable storage media, the program instructions, when executed by one or more computer processors, cause the one or more computer processors to:

train a machine learning model based on data associated with historic projects, data associated with a project type, data associated with an industry type, data associated with accessibility guidance and standards, and data associated with design best-practices associated with application design;

detect one or more elements added to a screen design of a user interface of an application by a first designer during the application design, wherein the application design includes a type of the one or more elements of the user interface, positioning of the one or more elements on the user interface, sizing of the one or more elements, and attributes of the one or more elements;

predict one or more next design elements of the screen design, based on the detected one or more elements added to the screen design and the trained machine learning model;

control presentation of the one or more next design elements that are visual elements selectable on a design artboard for a design file as a recommendation to the first designer;

whether the one or more next design elements from the recommendation are selected and added to the design artboard by the first designer;

and update the trained machine learning model, based on the determination that the one or more next design elements are selected and added to the design artboard.

8. The computer program product of claim 7, the program instructions further cause the one or more computer processors to:

monitor design builds of a plurality of designers working on a design project, wherein the plurality of designers includes the first designer;

determine inconsistencies of design between designs by the plurality of designers, wherein the inconsistencies are determined based on the machine learning model;

determine recommendations to resolve the inconsistencies of design element characteristics; and present an alert regarding the inconsistencies and the recommendations to resolve the inconsistencies, to the plurality of designers with the designs having the inconsistencies.

9. The computer program product of claim 8, the program instructions further cause the one or more computer processors to:

receive a proposed global design by a designer of the plurality of designers of the design project;

distribute the proposed global design to of the plurality of designers of the design project;

determine a decision regarding use of the proposed global design by input from the plurality of designers; and adjust the recommendations presented to respective designers of the plurality of designers, based on the decision regarding the use of the proposed global design.

10. The computer program product of claim 7, wherein the program instructions further cause the one or more computer processors to determine a predicted next design element that includes a template that is determined by recognition of a combination of the one or more next design elements added by the first designer to the design artboard.

11. The computer program product of claim 7, wherein the program instructions further cause the one or more computer processors to determine a context and a pattern of the user interface, based on setup information of a design project and the addition of the one or more next design elements to the design artboard.

12. A computer system for facilitating generation of a user interface design, the computer system comprising:

one or more computer processors;

one or more computer-readable storage media, and program instructions stored on the one or more computer-readable storage media, the program instructions, when executed by the one or more computer processors, cause the one or more computer processors to:

train a machine learning model based on data associated with historic projects, data associated with a project type, data associated with an industry type, data associated with accessibility guidance and standards, and data associated with design best-practices associated with application design;

detect one or more elements added to a screen design of a user interface of an application by a first designer during the application design, wherein the application design includes a type of the one or more elements of the user interface, positioning of the one or more elements on the user interface, sizing of the one or more elements, and attributes of the one or more elements;

predict one or more next design elements of the screen design, based on the detected one or more elements added to the screen design and the trained machine learning model;

control presentation of the one or more next design elements that are visual elements selectable on a design artboard for a design file as a recommendation to the first designer;

whether the one or more next design elements from the recommendation are selected and added to the design artboard by the first designer;

and update the trained machine learning model, based on the determination that the one or more next design elements are selected and added to the design artboard.

13. The computer system of claim 12, wherein the program instructions further cause the one or more computer processors to:

monitor design builds of a plurality of designers working on a design project, wherein the plurality of designers includes the first designer;

determine inconsistencies of design between designs by the plurality of designers, wherein the inconsistencies are determined based on the machine learning model;

determine recommendations to resolve the inconsistencies of design element characteristics; and present an alert regarding the inconsistencies and the recommendations to resolve the inconsistencies, to the plurality of designers with the designs having the inconsistencies.

14. The computer system of claim 13, wherein the program instructions further cause the one or more computer processors to:

receive a proposed global design by a designer of the plurality of designers of the design project;

distribute the proposed global design to of the plurality of designers of the design project;

determine a decision regarding use of the proposed global design by input from the plurality of designers; and adjust the recommendations presented to respective designers of the plurality of designers, based on the decision regarding the use of the proposed global design.

15. The computer system of claim 12, wherein the program instructions further cause the one or more computer processors to determine a predicted next design element that includes a template that is determined by recognition of a combination of the one or more next design elements added by the first designer to the design artboard.

16. The computer system of claim 12, wherein the program instructions further cause the one or more computer processors to determine a context and a pattern of the user interface, based on setup information of a design project and the addition of the one or more next design elements to the design artboard.

17. The computer system of claim 12, wherein the program instructions further cause the one or more computer processors to:

identify accessibility issues associated with the user interface; and present an alert and recommendations addressing the identified accessibility issues associated with the user interface, to the first designer.

* * * * *